United States Patent
Lake et al.

(10) Patent No.: US 10,057,181 B2
(45) Date of Patent: *Aug. 21, 2018

(54) METHOD AND APPARATUS FOR SOFTWARE PROGRAMMABLE INTELLIGENT NETWORK

(71) Applicant: Omnivergent Networks, LLC, Santa Clara, CA (US)

(72) Inventors: Shannon M. Lake, Carrollton, TX (US); Charles W. Gibson, Santa Clara, CA (US); N. Bruce Threewitt, Santa Clara, CA (US)

(73) Assignee: Omnivergent Networks, LLC, Santa Clara, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 14/327,898

(22) Filed: Jul. 10, 2014

(65) Prior Publication Data
US 2014/0328173 A1 Nov. 6, 2014

Related U.S. Application Data

(63) Continuation of application No. 13/404,811, filed on Feb. 24, 2012, now Pat. No. 8,782,244, which is a
(Continued)

(51) Int. Cl.
*H04L 12/925* (2013.01)
*H04L 12/801* (2013.01)
(Continued)

(52) U.S. Cl.
CPC ............ *H04L 47/722* (2013.01); *H04L 47/15* (2013.01); *H04L 47/18* (2013.01); *H04L 47/70* (2013.01);
(Continued)

(58) Field of Classification Search
CPC . H04L 12/5695; H04L 47/728; H04L 47/745; H04L 47/805; H04L 47/822;
(Continued)

(56) References Cited

U.S. PATENT DOCUMENTS 5,115,495 A   5/1992  Tsuchiya et al.
5,787,080 A   7/1998  Hulyalkar et al.
(Continued)

OTHER PUBLICATIONS

Non-Final Rejection Office Action dated Nov. 4, 2013 in connection with related U.S. Appl. No. 13/404,811.
(Continued)

*Primary Examiner* — Dung B Huynh
(74) *Attorney, Agent, or Firm* — Downs Rachlin Martin PLLC

(57) ABSTRACT

A reservation request is received for a data transport session. The reservation request contains a requested class of communication service through the asynchronous network. The state of the network along the route is then preferably determined and at least one end-to-end route through the network is obtained. The route is based on the requested class of communication service and the state of the network. The data transport session is then controlled, such that data is forced to travel along at least one route through the asynchronous network. This is preferably done by controlling multiple data controllers dispersed along the at least one route by mapping specific data protocols to specific routes, or mapping specific data protocols to specific ports in each data controller. If a state of the asynchronous network indicates that the route cannot transport data in conformity to the class of communication service, then the route is changed to a backup route through the network.

29 Claims, 12 Drawing Sheets

Related U.S. Application Data continuation of application No. 12/883,228, filed on Sep. 16, 2010, now Pat. No. 8,127,013, which is a continuation of application No. 12/053,489, filed on Mar. 21, 2008, now Pat. No. 7,801,995, which is a continuation of application No. 10/756,707, filed on Jan. 12, 2004, now abandoned.

(60) Provisional application No. 60/439,573, filed on Jan. 11, 2003.

(51) Int. Cl.
*H04L 12/913* (2013.01)
*H04L 12/911* (2013.01)
*H04L 12/927* (2013.01)

(52) U.S. Cl.
CPC .......... *H04L 47/724* (2013.01); *H04L 47/728* (2013.01); *H04L 47/745* (2013.01); *H04L 47/805* (2013.01); *H04L 47/822* (2013.01)

(58) Field of Classification Search
CPC ....... H04L 47/15; H04L 47/18; H04L 47/722; H04L 47/724
See application file for complete search history.

(56) References Cited

U.S. PATENT DOCUMENTS

| | | | |
|---|---|---|---|
| 5,881,131 A | 3/1999 | Farris et al. | |
| 5,923,849 A | 7/1999 | Venkatraman | |
| 5,995,503 A | 11/1999 | Crawley et al. | |
| 6,029,151 A * | 2/2000 | Nikander | G06Q 20/02 380/33 |
| 6,058,169 A * | 5/2000 | Bramnick | H04N 1/00209 358/407 |
| 6,151,324 A * | 11/2000 | Belser | H04L 12/4608 370/355 |
| 6,215,514 B1 | 4/2001 | Harris | |
| 6,301,252 B1 | 10/2001 | Rangachar | |
| 6,321,338 B1 | 11/2001 | Porras et al. | |
| 6,404,864 B1 | 6/2002 | Evslin et al. | |
| 6,415,329 B1 | 7/2002 | Gelman et al. | |
| 6,442,694 B1 | 8/2002 | Bergman et al. | |
| 6,452,915 B1 | 9/2002 | Jorgensen | |
| 6,475,090 B2 | 11/2002 | Roelofs | |
| 6,484,203 B1 | 11/2002 | Porras et al. | |
| 6,487,600 B1 | 11/2002 | Lynch | |
| 6,490,624 B1 | 12/2002 | Sampson et al. | |
| 6,502,135 B1 | 12/2002 | Munger et al. | |
| 6,529,515 B1 | 3/2003 | Raz et al. | |
| 6,587,438 B1 | 7/2003 | Brendel | |
| 6,592,273 B1 | 7/2003 | Habel et al. | |
| 6,603,112 B1 | 8/2003 | Medard et al. | |
| 6,614,781 B1 | 9/2003 | Elliot et al. | |
| 6,678,264 B1 * | 1/2004 | Gibson | H04L 12/5695 370/352 |
| 7,151,781 B2 | 12/2006 | MeLampy et al. | |
| 7,257,634 B2 | 8/2007 | Colby et al. | |
| 7,315,897 B1 | 1/2008 | Hardee et al. | |
| 7,457,277 B1 * | 11/2008 | Sharma | H04L 45/02 370/351 |
| 7,801,995 B2 | 9/2010 | Lake et al. | |
| 7,821,965 B2 | 10/2010 | Clemm et al. | |
| 8,782,244 B2 | 7/2014 | Lake, Sr. et al. | |
| 2002/0080794 A1 | 6/2002 | Reeves et al. | |
| 2002/0105909 A1 * | 8/2002 | Flanagan | H04L 29/06027 370/230 |
| 2003/0115480 A1 | 6/2003 | McDysan | |
| 2003/0128668 A1 * | 7/2003 | Yavatkar | H04L 45/02 370/238 |
| 2003/0140223 A1 | 7/2003 | Desideri | |
| 2003/0147400 A1 * | 8/2003 | Devi | H04L 45/00 370/395.21 |
| 2003/0152034 A1 | 8/2003 | Zhang et al. | |
| 2004/0071141 A1 | 4/2004 | Dhara et al. | |
| 2004/0090912 A1 * | 5/2004 | Loo | H04L 43/0817 370/217 |
| 2004/0193729 A1 | 9/2004 | Saraph | |
| 2006/0182034 A1 * | 8/2006 | Klinker | H04L 43/00 370/238 |
| 2012/0155478 A1 | 6/2012 | Lake et al. | |
| 2012/0311125 A1 | 12/2012 | Matthews et al. | |

OTHER PUBLICATIONS

Response to Non-Final Office Action dated Feb. 28, 2014 in connection with related U.S. Appl. No. 13/404,811.
Notice of Allowance dated Mar. 12, 2014 in connection with related U.S. Appl. No. 13/404,811.

* cited by examiner

METHOD AND APPARATUS FOR SOFTWARE PROGRAMMABLE INTELLIGENT NETWORK

RELATED APPLICATION DATA

This application is a continuation of U.S. patent application Ser. No. 13/404,811, filed Feb. 24, 2012, which is a continuation of U.S. patent application Ser. No. 12/883,228, filed Sep. 16, 2010, now U.S. Pat. No. 8,127,013 issued Feb. 28, 2012; which is a continuation of U.S. patent application Ser. No. 12/053,489, filed Mar. 21, 2008, now U.S. Pat. No. 7,801,995 issued Sep. 21, 2010; which is a continuation of U.S. patent application Ser. No. 10/756,707, filed Jan. 12, 2004 (abandoned); which claims priority to U.S. Provisional Patent Appl. No. 60/439,573, filed on Jan. 11, 2003. Each of these applications is incorporated herein by referenced in its entirety.

The present invention relates to networking. In particular, the present invention relates to an end-to-end network control system for improving Quality of Service (QoS), enhancing network and data security, availability, and reliability, monetizing network traffic, and reducing networking costs.

DESCRIPTION OF RELATED ART

Data networks are generally said to be connection-oriented or connectionless. Connection-oriented networks require an establishment of a data transmission session between two nodes before transmission can begin. Once communications are completed, the session is ended or torn down. Circuit-switched networks are connection-oriented because they require a dedicated channel for the duration of the session. The most ubiquitous circuit-switched network is the Public Switched Telephone Network (PSTN).

A connectionless network is a communications architecture that does not require the establishment of a session between two nodes before transmission can begin. The transmission of packets within Internet Protocol (IP) networks, for example, is connectionless. In general, IP networks include a collection of IP router peers, each of which is part of an Autonomous System (AS), where each router has a limited view of the network in real-time, restricted to the next "hop," or connection, to an adjacent router. For example, in this environment, identical packets transmitted across the Internet may take completely different routes between the same source and destination. If a packet does not reach its destination, it is simply resent or discarded.

This characteristic inhibits carriers from guaranteeing Quality of Service (QoS) when transporting voice or other streaming or real-time data services over connectionless networks, such as IP networks in general and the Internet in particular. Because this "flaw" in connectionless networks is inherent, streaming or real-time data traffic has historically been provided by connection-oriented communications architectures, like circuit-switched telecommunications networks. Connectionless networking works well for non-real-time transmissions, such as requests for Web-pages, email, or the like, but does not work well for real-time or streaming transmissions such as voice or video-conferencing. In summary, the performance of connectionless networks is inherently unpredictable.

Connectionless networks also have other drawbacks. For example, IP routers typically make sub-optimal routing decisions based on single parameters, such as availability, without taking into account appropriate combinations of other factors such as transport cost, network congestion, latency, required security, or other parameters. Managing data packets in this manner is inefficient and needlessly expensive, as management and control functions are replicated at each router, and carriers must over-provision their networks (a waste of resources) in order to even approach on-time delivery required by streaming traffic.

In addition, connectionless data networks typically utilize in-band signaling and control, i.e., a single logical plane both to transport data packets and to control communications among the various elements in the network, such as routers or switches. As such, control information is as accessible by users as the transmitted data, so both are vulnerable to a variety of attacks.

Still further, current IP transport technologies offered to network carriers, including Multi-Protocol Label Switching (MPLS), generally do not generate transaction records, making usage-based or premium service billing all but impossible. The industry's answer has been subscription-based billing or flat pricing, an inefficient and unprofitable economic model for streaming or real-time data traffic that has led to cost cutting with an inevitable and consequential erosion in service levels.

In response to the above concerns, the Communications industry has invested billions of dollars in an attempt to provide predictable network performance. Attempted solutions include MPLS, Route Optimization, and Deep-packet Discovery. None of these technologies, however, have succeeded in addressing the above mentioned concerns. Each of these "solutions" has one or more of the following inherent architectural flaws: a connectionless network cannot guarantee predictable performance or accurately track usage details; in-band control limits security by exposing commands to users; stateless network control cannot provide timely network response to changing conditions; and distributed, autonomous control logic cannot extend network control from end-to-end or coordinate usage for optimal efficiency.

Accordingly, a method and system for providing predictable and reliable network performance in an IP network, while addressing the above mentioned drawbacks and concerns, would be highly desirable.

BRIEF SUMMARY OF THE INVENTION

According to one embodiment, there is provided a system/method for controlling on-demand sessions in asynchronous networks, enabling enhanced security, and deterministic performance, while enhancing the security and predictability of existing best-effort connectionless traffic, and monetizing data transport services (increasing revenues) with reduced operating costs for carriers in IP-based and other data transport networks.

According to the invention there is provided a computer-implemented method for end-to-end control of data transported through an asynchronous network. A reservation request is received for a data transport session, such as from at least one serviced device or is generated within a management plane. The reservation request contains a requested class of communication service through the asynchronous network. The state of the network along the route is then preferably determined by instructing a measurement signal to be transported along at least part of the route and determining whether the measurement signal was transported and received in accordance with predetermined performance characteristic limits. Determining the state of the network preferably utilizes a common timing reference with sufficient accuracy to enable one-way delay measurements between data controllers dispersed throughout the network. Furthermore, a time interval of such determining is preferably dynamically adjusted based on current characteristics of the route between the data controllers. In another embodiment, determining the state of the network comprises determining parametric guard band limits; ascertaining a state of at least part of the network; determining whether the state is outside of the guard band limits; and transmitting an alarm, if the state is outside of the guard band limits. The state of the network is then transmitted to a management controller via a out-of-plane dedicated physical circuit or an in-plane dedicated virtual circuit.

At least one end-to-end route through the network is then obtained, preferably from an inventory of multiple predetermined routes. The route is based on the requested class of communication service and the state of the network. The data transport session is then controlled, such that data is forced to travel along at least one route through the asynchronous network. This is preferably done by controlling multiple data controllers dispersed along the at least one route. Also in a preferred embodiment, the controlling comprises mapping specific data protocols to specific routes, or mapping specific data protocols to specific ports in each data controller. If a state of the asynchronous network indicates that the route cannot transport data in conformity to the class of communication service, then the route is changed to a backup route through the network.

Also in a preferred embodiment, the class of service is dependent on some weighted combination of the required bandwidth, transport data rate, maximum delay allowed by the class of communication service, variations in delay allowed by the class of communication service, maximum allowed transport cost, allowed priority relative to other data being transported, or required reliability of the class of communication service.

Usage patterns of the data transport session may be monitored or recorded, preferably in real-time. Also, the actual and planned use of a route may be recorded to enable differentiated usage-based billing. The system preferably collects data regarding the current configuration of a connectionless network to establish the configuration of a data controller so that the data controller can support connectionless traffic.

According to the invention there is also provided a system for end-to-end control of data transport through a connectionless network. The system includes an asynchronous network, multiple data controllers dispersed throughout the asynchronous network, and at least one management controller coupled to the multiple data controllers via a circuit. The at least one management controller preferably contains instructions for: receiving a reservation request for a data transport session, where the reservation request contains a requested class of communication service through an asynchronous network; obtaining at least one end-to-end route through the network, where the route is based on the requested class of service and a state of the network; and controlling the multiple data controllers, such that data is forced to travel along the at least one route. In a preferred embodiment, the network is an Internet Protocol (IP) network. Each data controller preferably includes a mechanism configured to change a destination address of each data packet in the data transfer session to direct the data packet to a next data controller along the route. In a preferred embodiment, such a mechanism is an in-bound Content Addressable Memory (CAM) and an out-bound CAM.

Accordingly, the present invention is a cognitive system that provides the necessary control for sessions with enhanced security and deterministic performance. The cognitive network is stateful, i.e., is aware of the status of each part of the managed network within a requisite timeframe to enable near-real-time control of the overall network. A moving target, with today's technology this near-real-time-frame ranges from hundreds of microseconds through seconds ($10^{-4}$-$10^0$ seconds), depending on what aspect of the network is being observed or controlled. The cognitive network also has connection-oriented network behavior using logically coherent management and out-of-band signaling. The cognitive network is also preferably linearly scalable, fault-tolerant, backward-compatible with any packet, cell, or frame data transport infrastructure, and incrementally deployable.

The cognitive network's architecture comprises in-bearer-plane measurement and control devices, referred to herein as data controllers, interconnected via an out-of-band, end-to-end management and control system preferably using dedicated control circuits. This management controller preferably acts in near-real-time based on network state data, allowing the network to constantly adapt to changing conditions. This network also preferably features active link monitoring at sub-millisecond intervals, industry-standard connection setup, and rapid fault recovery (preferably within SONET Automatic Protection Switching times). Furthermore, the cognitive network provides pro-active control for on-demand switched virtual circuits, guaranteed end-to-end QoS, requirements-based routing, and unparalleled security and privacy. The cognitive functions of the network also allow for activity monitoring, detection, analysis, and mitigation of, and active defensive countermeasures against, malicious network attacks. The cognitive network can assume the characteristics of both connectionless and connection-oriented networks.

Routing logic is moved out of the switching devices and into an out-of-band management plane assisted by an off-line route generator, residing in a cognitive plane. With near real-time visibility into the state of the network, the preferred automated management function makes optimal end-to-end routing decisions that normally occur only once per flow from end-to-end rather than per packet and per hop. These decisions are sent simultaneously to the affected switching devices used in the primary route and back-up route(s). These features reduce the overall network computational load by several orders of magnitude, yielding a corresponding increase in efficiency and reduction in capital and operating expenditures.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings.

DETAILED DESCRIPTION OF THE INVENTION

Figure 1:
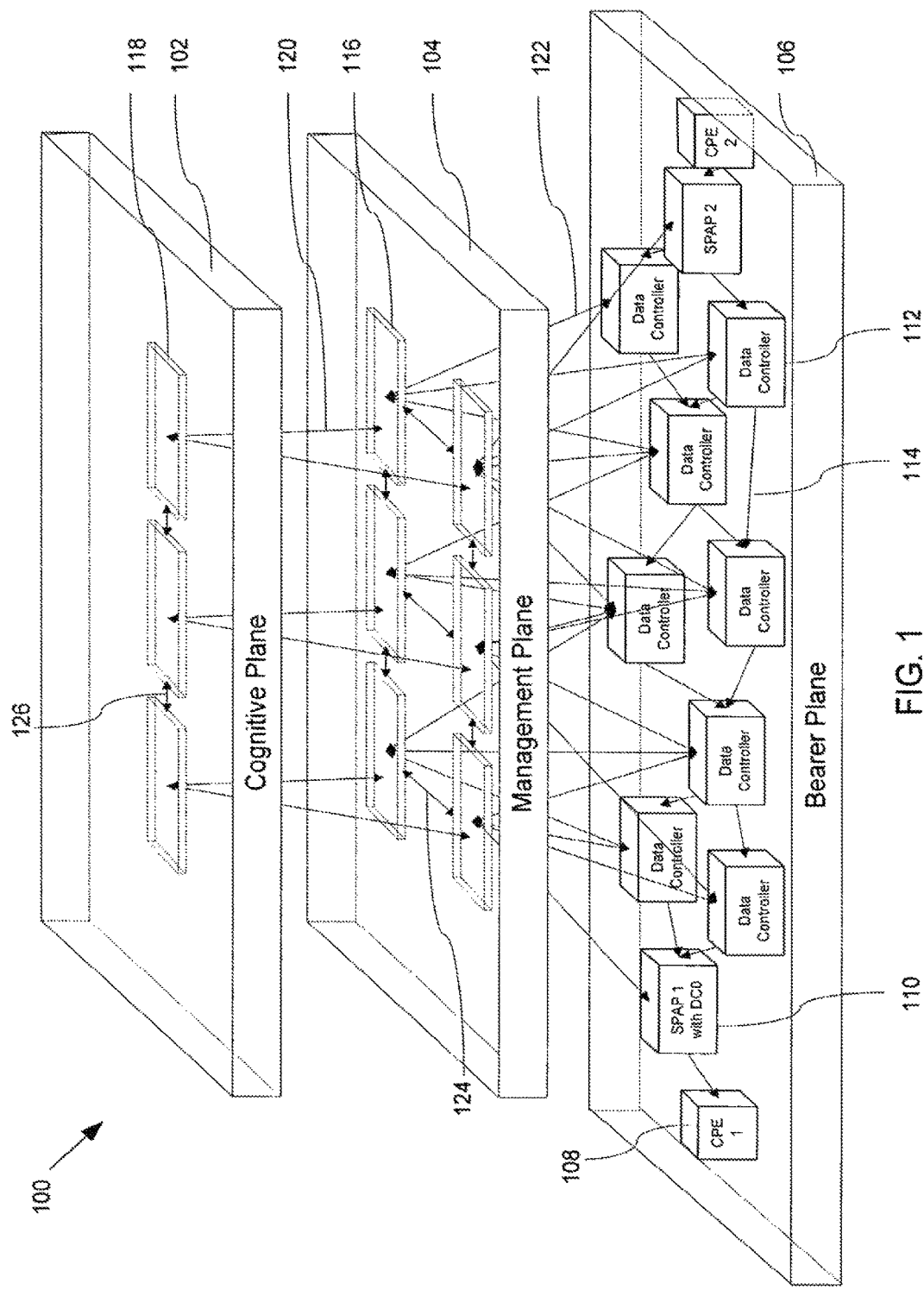
FIG. 1 is a schematic diagram of a cognitive network architecture, according to an embodiment of the invention.

FIG. 1 is schematic of a cognitive network 100, according to an embodiment of the invention. The cognitive network 100 is made up of three distinct functional layers or planes, namely a cognitive plane 102, a management plane 104, and an bearer plane 106. The bearer plane 106 is similar in many respects to current IP networks, such as the Internet. For example, customer premises equipment (CPE) 108 communicate with their respective Service Provider's Aggregation Point (SPAP) 110 via any suitable communication link, such as T1, Digital Subscriber Line (DSL), or cable connection. The CPE may include a DSL modem, cable modem, or Voice Over IP (VoIP) telephone, or the like. The SPAP includes or provides connectivity to at least the same components as the data controllers described below. Also, although not shown, existing IP network elements, such as IP routers and switches, are dispersed throughout the network, as is well understood by those skilled in the art. For example, each IP data link 114 may be a dedicated direct link or may include multiple routers and/or switches coupled to one another.

What distinguishes the bearer plane over current IP networks is that: (1) data controllers 112 (described in further detail below) are strategically dispersed throughout the network between existing data links 114 to direct data traffic over the bearer plane 106, and (2) the aggregation point 110 and the data controllers 112 communicate directly with the management plane 104 and/or the cognitive plane 102 over out-of-bearer-plane circuits.

In use, a first user using customer premises equipment 1 (CPE 1) may communicate with a second user using customer premises equipment 2 (CPE 2) over bearer plane 106 through aggregation points 1 and 2 (SPAP 1 and SPAP 2) 110, one or more data controllers 112, and one or more IP data links 114 (that may themselves include one or more IP routers, switches, or the like).

The management plane 104 preferably includes multiple management controllers 116 (described in more detail below). Each management controller 116 preferably communicates directly with multiple data controllers 112 via out-of-bearer-plane communication links 122. The communication links 122 are preferably distinct physical out-of-plane circuits. Alternatively, the communication links 122 may be distinct virtual circuits established within the bearer plane 106. The management controllers 116 also preferably communicate with one another via out-of-bearer-plane communication links 124. The out-of-bearer-plane communication links 122 preferably have known and stable operating and performance characteristics. The management controllers 116 preferably utilize these known performance characteristics to transmit a timing reference to each data controller 112 in bearer plane 106 with requisite accuracy to successfully measure network transport events. Transporting typical voice traffic, for example, requires meeting several industry-standard network performance criteria: a bandwidth of 64 k-bits/sec, a maximum delay (latency) through the network from end to end of, for example, 200 msec, a specified jitter (instantaneous variations in latency from packet to packet) limit, etc. In order to measure latency and jitter to the requisite degree of precision for this service, the overall cognitive network must be able to detect and manage events of a duration of the order of tens of milliseconds. In general, controlling a process requires measuring that process. The measurement process in this service case preferably probes network links at an interval sufficiently small to manage these ~10 msec events (say every few hundred microseconds). To perform this measurement with the requisite accuracy, the timing reference needs to be synchronized in each data controller 116 to within ±10 microseconds (µsec). There are several well known means for providing a timing reference with this requisite precision.

The cognitive plane 102 includes one or more cognitive controllers 118. Each cognitive controller 118 is preferably coupled to one or more of the management controllers 116 via out-of-bearer-plane communication links 120. The cognitive controllers 118 also preferably communicate with one another via dedicated circuit communication links 126. The dedicated communication links preferably have known and stable operating and performance characteristics. The cognitive controllers 118, among other functions, preferably compute routes for requested classes of services. Such computation of routes preferably does not need to be performed in real-time.

Furthermore, the management and cognitive controllers preferably includes a requisite degree of fault tolerance and redundancy. Therefore, failure of one or more of these controllers does not have a critical effect on the system.

Figure 2A:
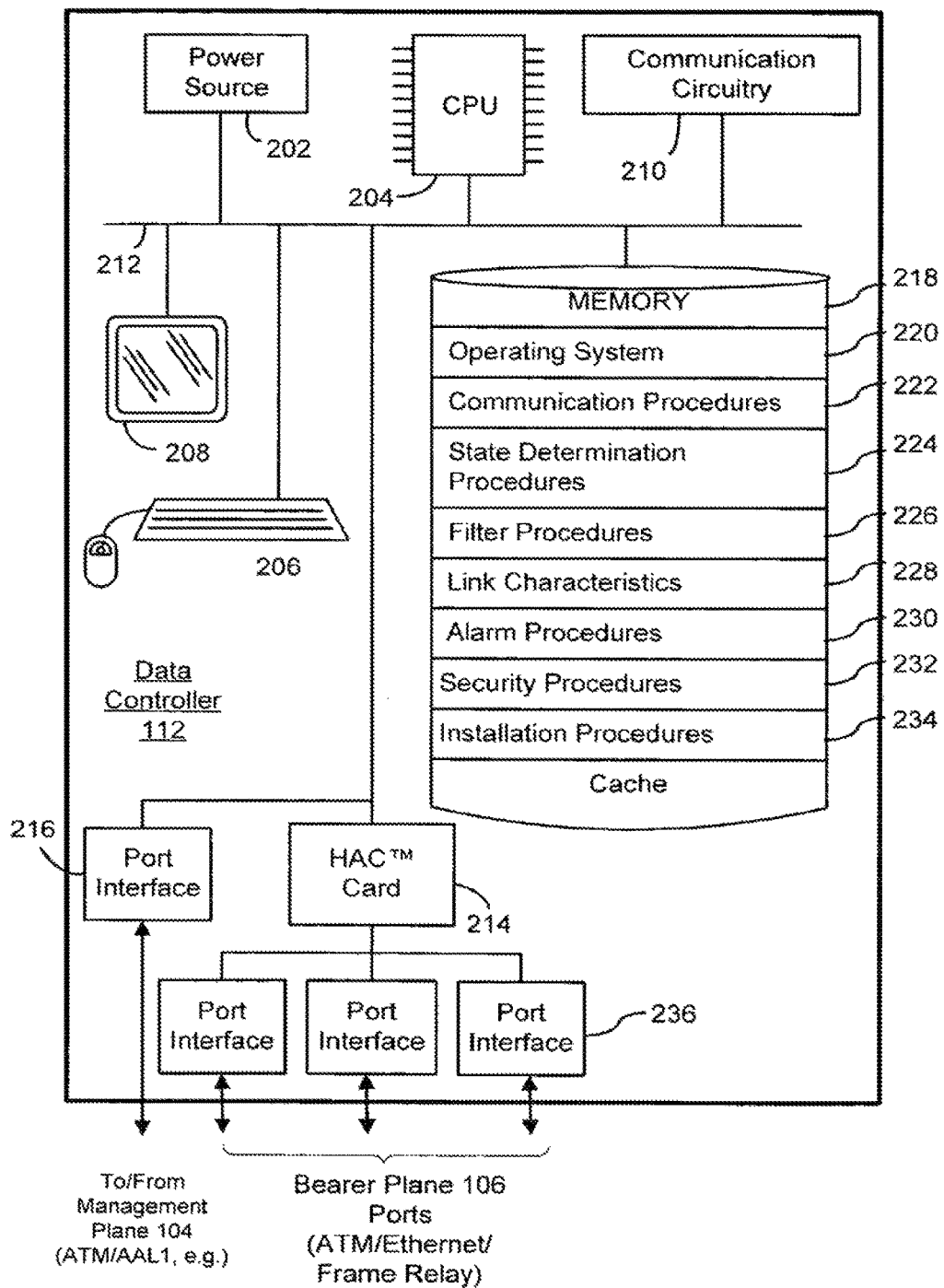
FIGS. 2A and 2B are block diagrams of one of the data controllers shown in FIG. 1, differentiated by performance levels.
Figure 2B:
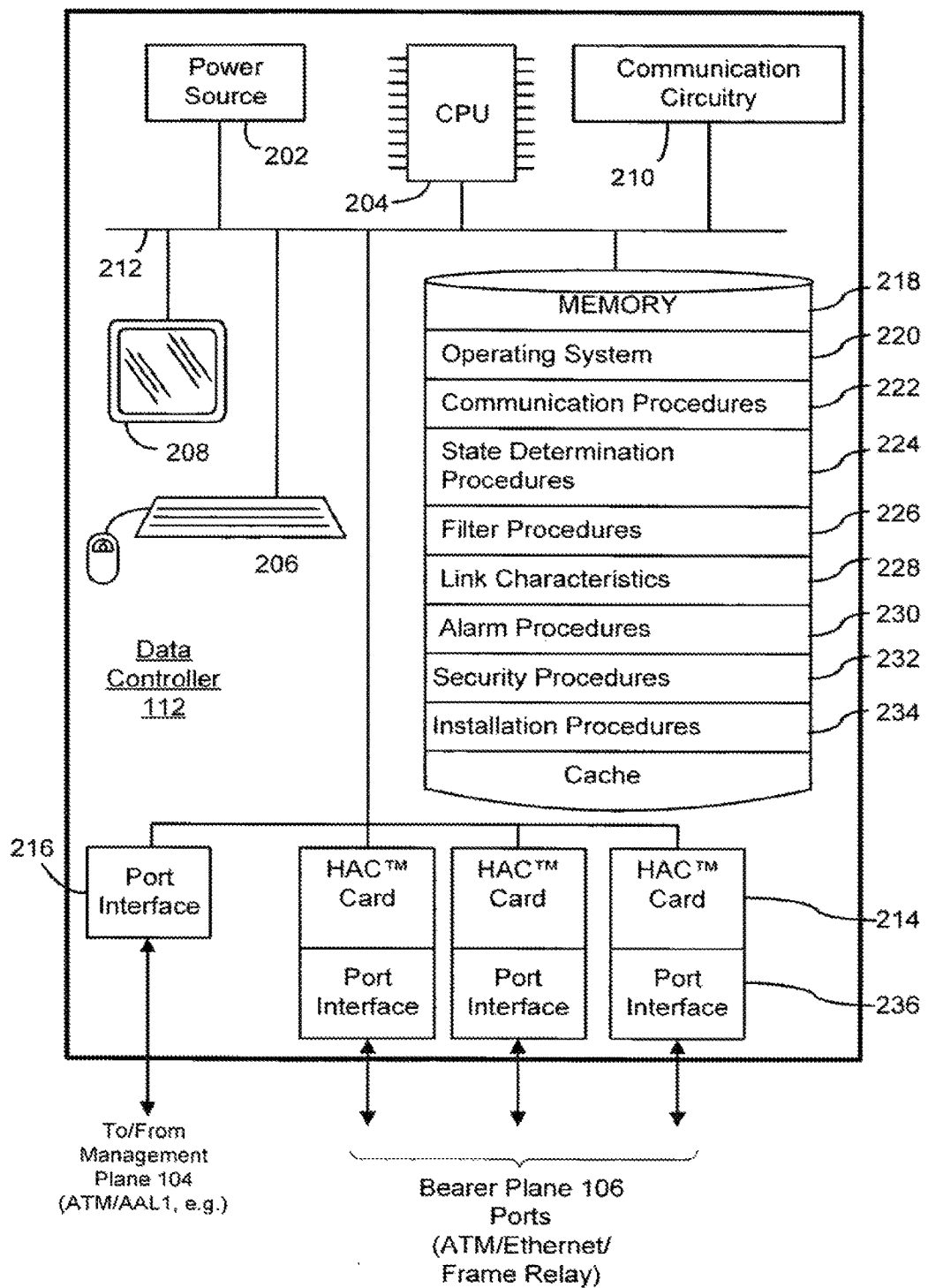

FIGS. 2A and 2B are block diagrams of one of the data controllers 112 shown in FIG. 1. The block diagrams of data controller 112 depicted in FIGS. 2A and 2B differ in architecture slightly to accommodate a spectrum of performance (bandwidth) requirements expected in normal network use. In FIG. 2A, the data controller 112 shares a switching element called the HAC™ card 214 (see FIGS. 5A and 5B) among the various bearer plane interface ports for relatively low bandwidth applications. In FIG. 2B, the data controller 112 contains a separate HAC™ card 214 for each bearer plane port interface for relatively higher bandwidth applications.

The data controller 112 preferably includes: at least one data processor or central processing unit (CPU) 204; memory 218; communication circuitry 210 for communicating with the management plane controllers 116 (FIG. 1) and/or other data controllers 112; a power source 202 configured to be coupled to a source of power; at least one Header Address Conversion (HAC™) card 214 for converting the headers of data packets as described below; port interfaces 216 and 236; and at least one bus 212 that interconnects these components. The data controller 112 may also optionally include one or more user interface devices, such as a monitor 208, and a keyboard/mouse 206. Furthermore, one or more of the port interfaces 236 are preferably coupled to one or more HAC™ cards 214. These port interfaces 236 are preferably Network Interface Cards (NICs). Each port interface 236 preferably communicates over the bearer plane 106 using one or more communication protocols, such as ATM, Ethernet, or the like. In addition, port interface(s) 216 communicate directly with the management plane 104 (FIG. 1) via at least one means, such as, for example, a dedicated circuit using any suitable communication protocol, such as asynchronous transfer mode (ATM), ATM Adaptation Layer 1 (AAL1), or the like.

The memory 218 preferably includes high-speed random access memory and may include non-volatile memory, such as one or more magnetic disk storage devices. The memory 218 preferably stores an operating system 220, such as LINUX®, UNIX® or WINDOWS®, that includes procedures for handling basic system services and for performing hardware-dependent tasks. The memory 218 also preferably stores communication procedures 222 used for communicating with the management plane controllers 116 (FIG. 1), other data controllers 112, and the remainder of the existing network. In particular, the communication procedures 222 are used for receiving routes and/or session identifiers (IDs) from the management controllers; reporting state information to the management controllers; receiving data frames or packets; and for transmitting data frames or packets, as described below in relation to FIGS. 7A-7D.

The memory 218 also preferably includes: state determination procedures 224; filter procedures 226; link characteristics 228; alarm procedures 230; physical and network security procedures 232; installation procedures 234; and a cache for temporarily storing data. The state determination procedures 224 determine the state of the network surrounding and including the data controller 112. Such a determination of the state preferably happens in near-real-time (i.e., the network state is sufficiently current so as to be useful in controlling the network's behavior) with variances outside predetermined link performance limits forwarded to the management controllers. In a preferred embodiment, the state determination procedures 224 include "heartbeat" packet generation and processing procedures that issue heartbeat packet(s) every few hundred microseconds (or some other suitable interval determined by network characteristics) and report on the transmittal and receipt of the heartbeat packet(s). The heartbeat packets are preferably of varying lengths and have varying payloads, but contain at the least an accurate timestamp that is synchronized with the time reference of the receiving data controller. The heartbeat interval is preferably varied as needed to trade off overhead versus testing granularity. The accumulated data allows the management plane to compute a stateful view of the relevant portion of the network from end to end. In other words, the heartbeat generation and processing procedures request each of the data controllers to generate and transmit a heartbeat packet to and through a neighboring data controller. The data controller then reports back to the management controller if it did not receive the heartbeat packet in a manner consistent with the predetermined limits. In this way, the data controllers can continually report their operating state and/or the operating state of the surrounding network links to the management controllers.

The filter procedures 226 assess link state changes for relevancy and are mirrored with related procedures in the management controller. Data relating to the link characteristics 228 are stored in the data controller 112 and reported to the management plane 104 from time to time. The alarm procedures 230 are used to generate and transmit an alarm to the management controllers when a data link or the data controller 112 itself is not operating according to a minimum predefined standard. Further details of the operation of the data controllers are described below in relation to FIGS. 7A-7D.

Furthermore, each data controller preferably contains a range (guard band) around each state parameter measured or monitored. Directly measured parameters include latency, availability, packet loss, and bit errors, where each such parameter is measured for a variety of packet sizes and insertion rates. The system accumulates these data and adds other calculated and entered parameters, including, but not limited to, reliability, link cost, geographic location, carrier security level, jitter, bit error rates, bandwidth, packet loss rates, and any other useful parameter that can be specified, measured, inferred, or calculated. Taken together, these parameters form the basis for constructing data communication sessions with defined "Heuristics of Service" (HoS), a superset of Quality of Service (QoS). In operation, applications may request a given mix of parameters or HOS™ class, and the system provisions virtual circuits to satisfy the needs of the requested service.

Figure 3:
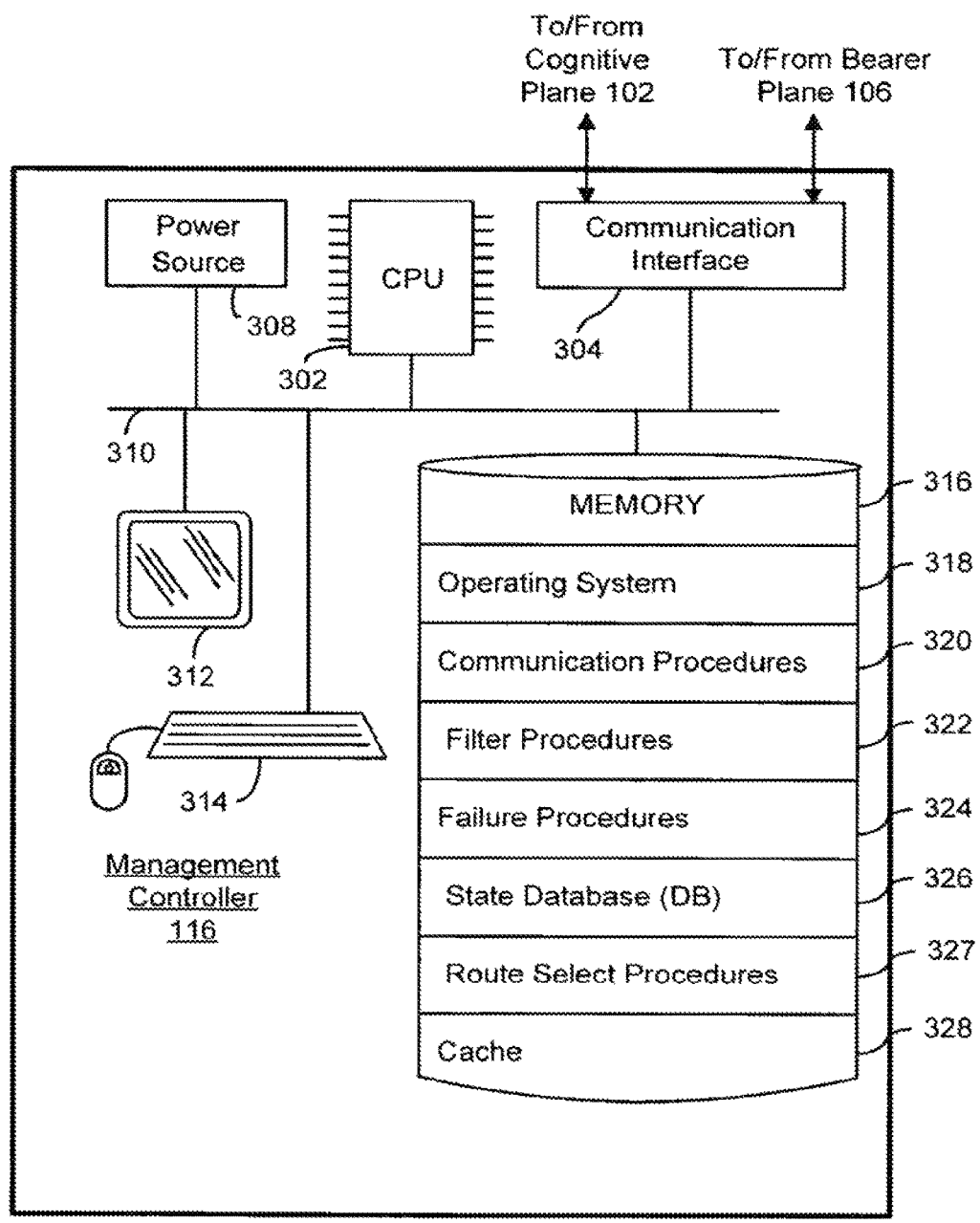
FIG. 3 is a block diagram of one of the management plane controllers shown in FIG. 1.

FIG. 3 is a block diagram of one of the management plane controllers 116 shown in FIG. 1. The management plane controller 116 preferably includes: at least one data processor or central processing unit (CPU) 302; memory 316; a communication interface 304 for communicating with the data controllers 112 (FIG. 1), other management plane controllers 116, and/or cognitive plane controllers 118 (FIG. 1); a power source 308 configured to be coupled to a source of power; and at least one bus 310 that interconnects these components. The management plane controllers 116 may also optionally include one or more user interface devices, such as a monitor 312, and a keyboard/mouse 314.

The memory 316 preferably includes high-speed random access memory and may include non-volatile memory, such as one or more magnetic disk storage devices. The memory 316 preferably stores an operating system 318, such as LINUX®, UNIX® or WINDOWS®, that includes procedures for handling basic system services and for performing hardware dependent tasks. The memory 316 also preferably stores communication procedures 320 used for communicating with the data controllers 112 (FIG. 1), other management plane controllers 116, and/or cognitive plane controllers 118 (FIG. 1). In particular, the communication procedures 320 are used for receiving state reports from the data controllers; receiving routes from the cognitive plane controllers; and/or communicating routes and/or session IDs to the data controllers, as described below in relation to FIGS. 7A-7D.

The memory 316 also preferably includes: filter procedures 322 for filtering relevant state information from non-relevant information; failure procedures 324 for determining whether failure or relevant state change have occurred of a data controller or other part of the network; a state database for storing state information on the status of the network; route select procedures 327 for selecting routes that qualify for the class of service requested; and a cache 328 for temporarily storing data. It should be appreciated that the state database 326 may be stored locally, externally, or elsewhere. Further details of the operation of the management plane controllers are described below in relation to FIGS. 7A-7D.

Figure 4:
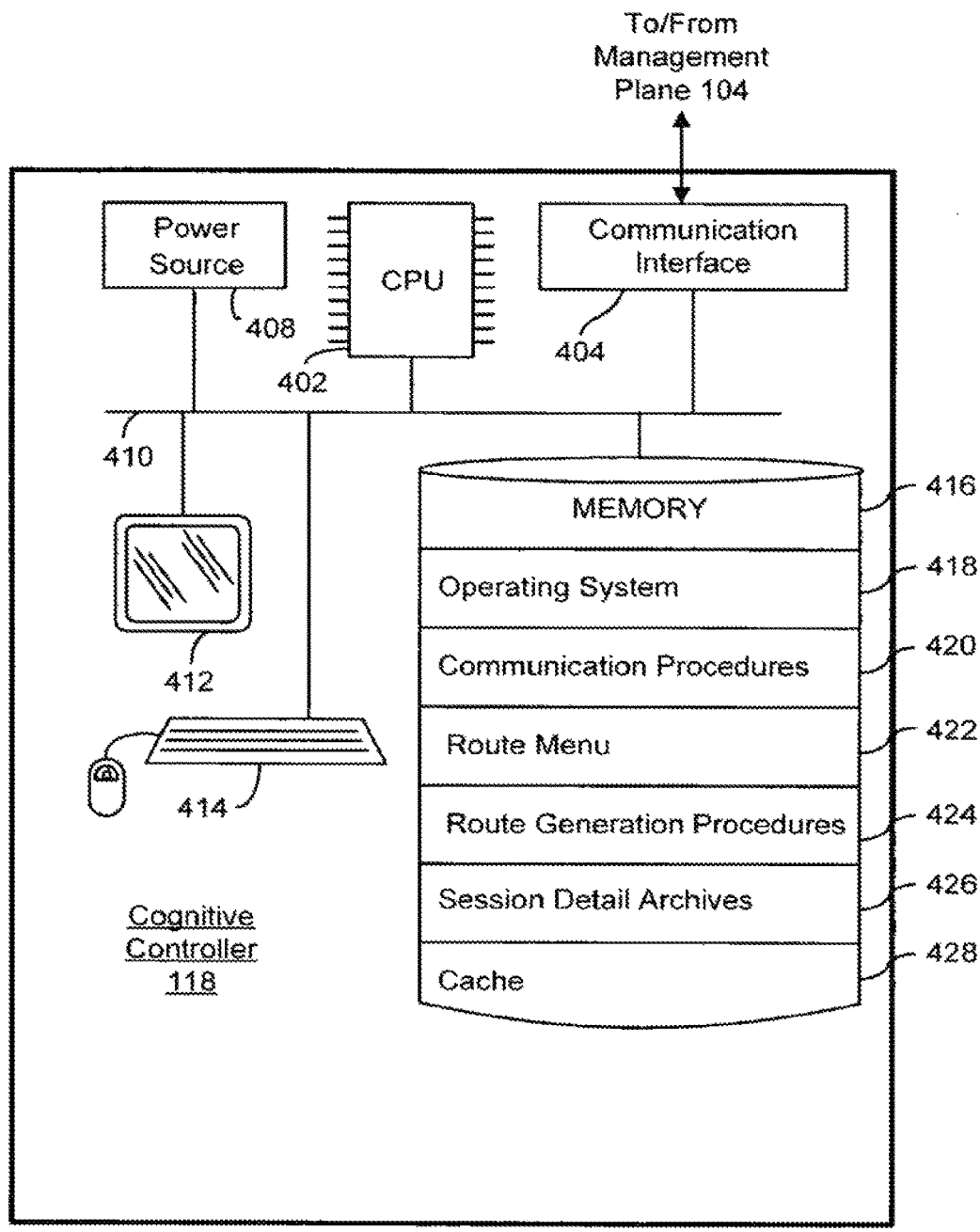
FIG. 4 is a block diagram of one of the cognitive plane controllers shown in FIG. 1.

FIG. 4 is a block diagram of one of the cognitive plane controllers 118 shown in FIG. 1. The cognitive plane controller 118 preferably includes: at least one data processor or central processing unit (CPU) 402; memory 416; a communication interface 404 for communicating with the management plane controllers 116 (FIG. 1) and/or the other cognitive plane controllers 118; a power source 408 configured to be coupled to a source of power; and at least one bus 410 that interconnects these components. Each cognitive plane controller 118 may also optionally include one or more user interface devices, such as a monitor 412, and a keyboard/mouse 414.

The memory 416 preferably includes high-speed random access memory and may include non-volatile memory, such as one or more magnetic disk storage devices. The memory 416 preferably stores an operating system 418, such as LINUX®, UNIX® or WINDOWS®, that includes procedures for handling basic system services and for performing hardware dependent tasks. The memory 416 also preferably stores communication procedures 420 used for communicating with the management plane controllers 116 (FIG. 1) and/or the other cognitive plane controllers 118. In particular, the communication procedures 420 are used for transmitting routes to the management plane controllers, as described below in relation to FIGS. 7A-7D.

The memory 416 also preferably includes: a route menu 422 of all primary and backup routes for particular classes of service; route generation procedures 424 for computing the primary and backup routes; and a cache for temporarily storing data. Further details of the operation of the management plane controllers are described below in relation to FIGS. 7A-7D.

Figure 5A:
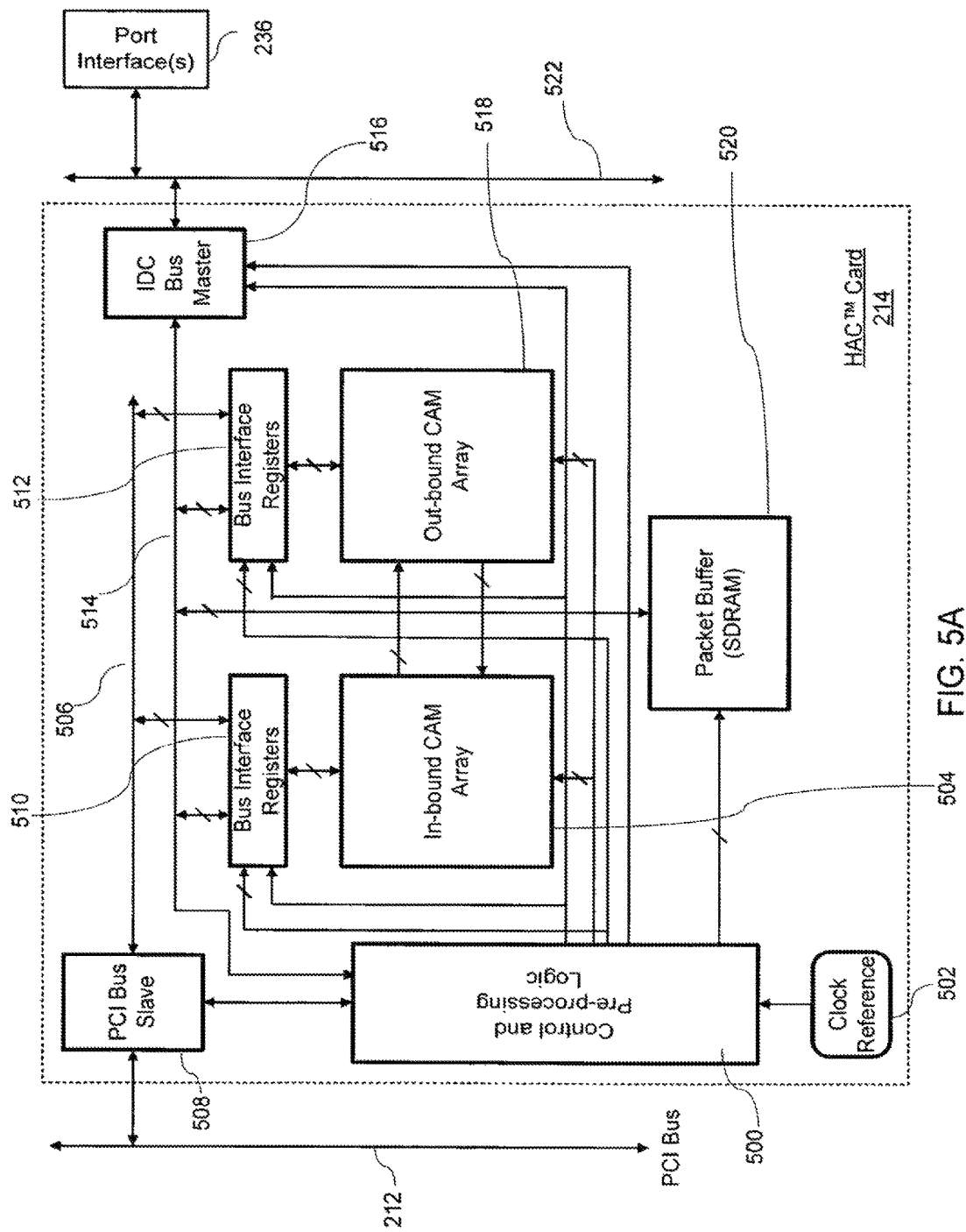
FIGS. 5A and 5B are block diagrams of the header address conversion (HAC™) printed circuit card shown in FIG. 2, differentiated by performance levels.
Figure 5B:
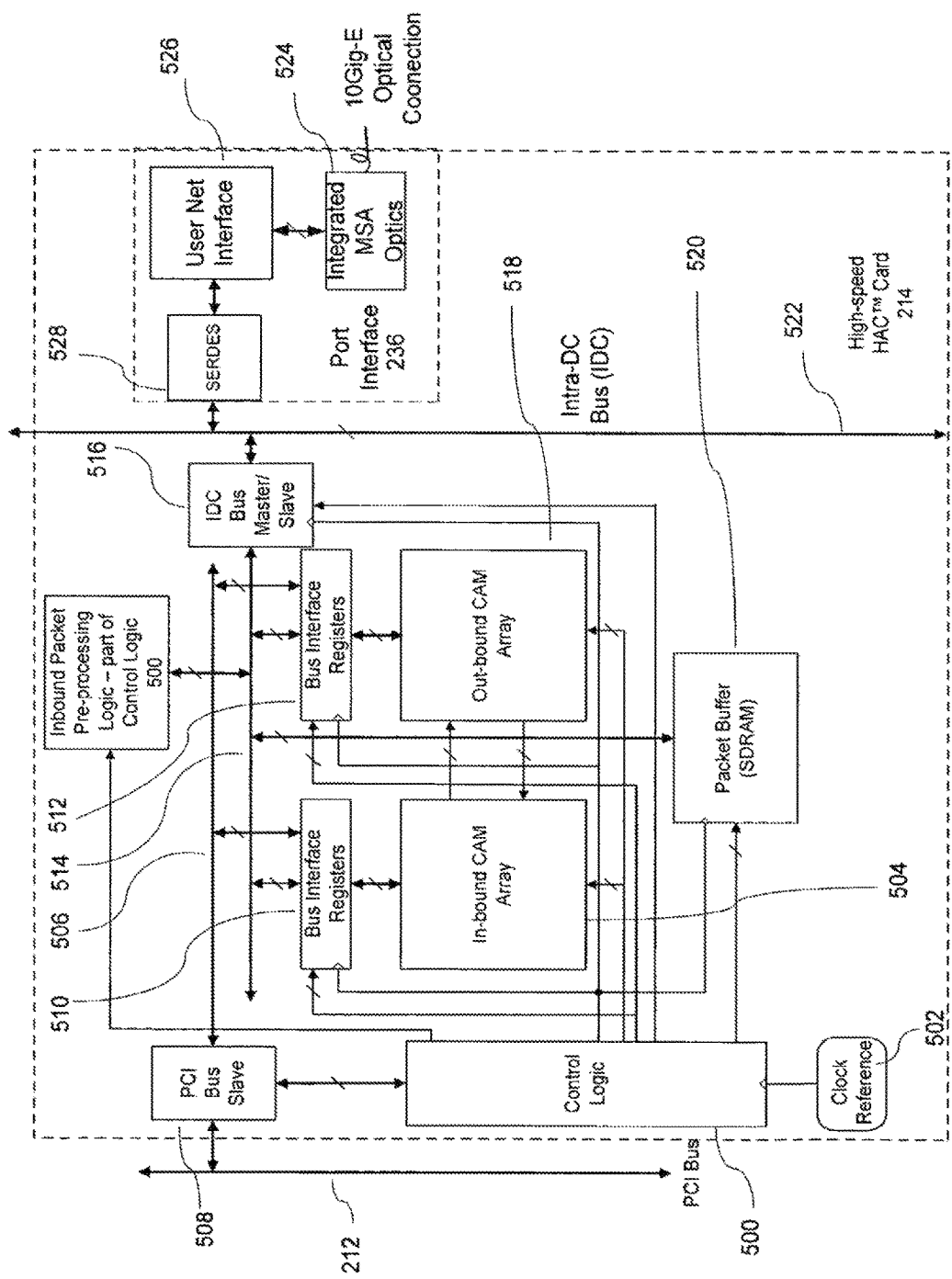

FIGS. 5A and 5B are block diagrams of the header address conversion (HAC™) card 214 shown in FIGS. 2A and 2B. For lower performance (bandwidth) data controllers, the HAC™ card 214 shown in FIG. 5A is shared among the port interfaces 236. For higher performance (bandwidth) data controllers; a separate HAC™ card 214, shown in FIG. 5B, is used for each port interface 236.

The HAC™ card 214 is preferably coupled to the PCI bus 212 (FIGS. 2A and 2B) via a PCI bus slave 508. In the lower performance embodiment shown in FIG. 5A, the HAC™ card 214 is preferably coupled to one or more port interfaces 236 via an Intra-DC (DC) bus master 516 and IDC bus 522. In the higher performance embodiment shown in FIG. 5B, the port interface 236 comprises a media-specific adapter 524 (An MSA allows the device to be readily adapted to any number of different types of transport media.) for coupling port interface 236 to IP links 114 (FIGS. 1 and 2), a user network interface processor chip 526 for processing layer 2 packet headers, and a serializer/deserializer (SERDES) 528 for coupling to the IDC bus 522. Components 524, 526, and 528 are commonly used to connect systems to high-speed optical networks. Equivalent components are available to connect systems to high-speed electronic networks.

The HAC™ card 214 also preferably includes control and pre-processing logic 500; a clock reference 502 for keeping an accurate timing reference preferably within the range of tens of microseconds; a search means, such as an in-bound Content Addressable Memory (CAM) array 504, and associated bus interface register 510; an out-bound CAM 518 associated bus interface register 512; and a packet buffer 520. The control and pre-processing logic 500 is coupled to and controls the components within the HAC™ card 214.

The HAC™ card 214 also separates the bearer plane 106 from the management plane 104, thereby reducing opportunities for malicious attack and unauthorized control of the network. The bearer plane 106 traffic exists only on the bearer plane 106 so that no network user can access the management plane 104 or the cognitive plane 102. To that end, management plane 104 traffic enters the HAC™ card 214 via bus 506, and bearer plane 106 traffic enters HAC™ card 214 via separate bus 514.

The CAM arrays 504 and 518, also known as "associative storage," are specialized memory chips in which each bit position can be compared against a corresponding bit position in an input called a Comparand. In other words, the CAM's content is compared in each bit cell simultaneously to the corresponding bit cell in the Comparand, allowing for very fast table lookups. Since the entire chip is compared at the same time, the data content can often be randomly stored without regard to an addressing scheme which would otherwise be required. However, since CAM chips are considerably smaller in storage capacity than regular memory chips, additional CAM chips must be added (cascade mode) as the network expands. The addition of CAM chips allows for linear scalability as the network traffic grows, thereby serving a larger number of users without requiring large upfront costs, without breaking down, and without requiring major changes in procedure.

Figure 6:
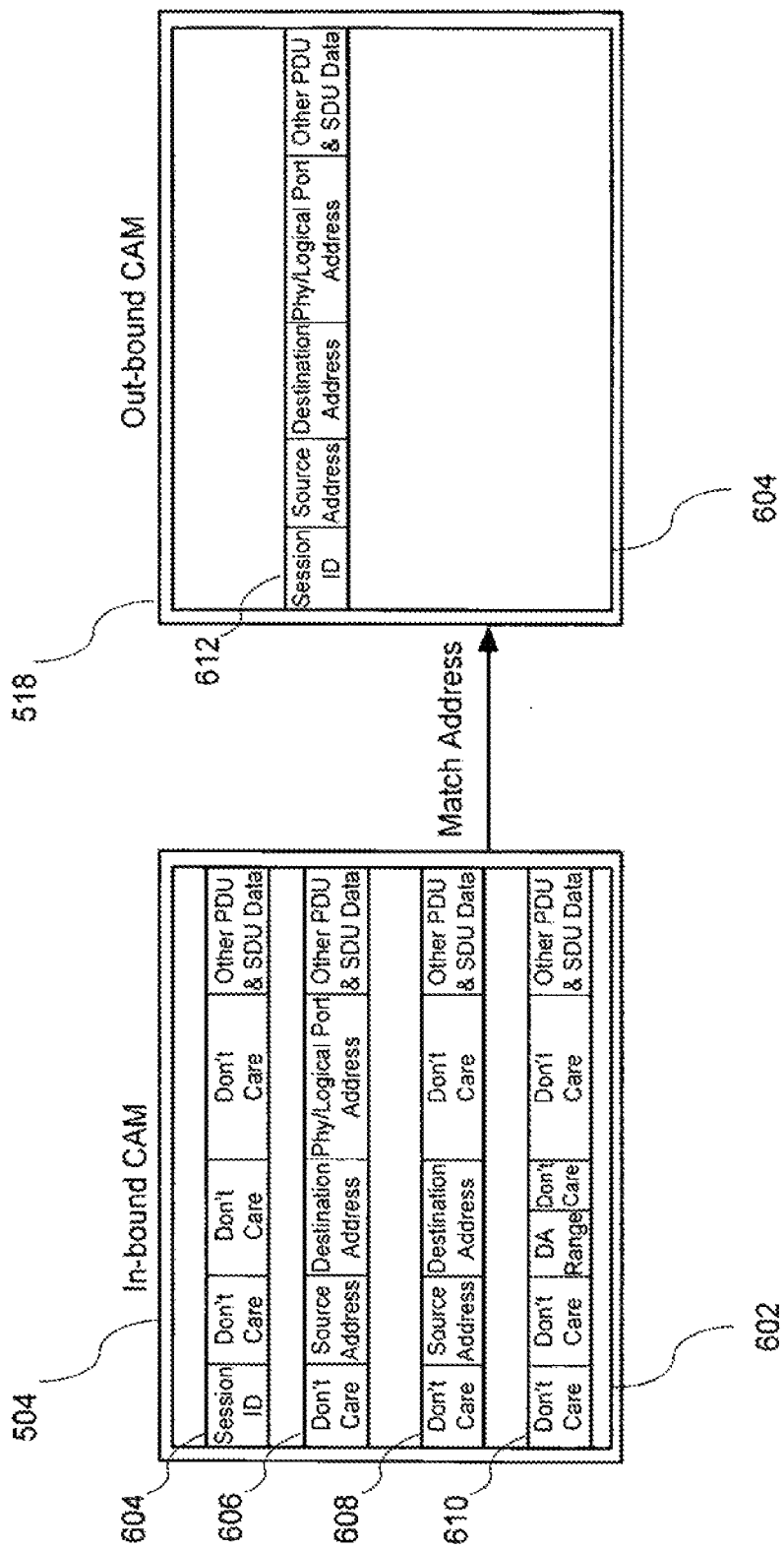
FIG. 6 is a block diagram of the Content Addressable Memory (CAM) tables shown in FIG. 5.

In use, data packets received at the port interface(s) 236 have relevant portions of their headers sent through header pre-processing logic contained in control logic 500 to in-bound CAM Array 504. The packet enters the packet buffer 520 (FIGS. 5A and 5B), which is preferably Synchronous Dynamic RAM (SDRAM), while the header is being processed by the CAMs. Relevant portions of the header enter the in-bound CAM Array 504 and are compared against an in-bound lookup table 602 (FIG. 6) stored in CAM 504.

The header portions participating in the comparison depend on the type of flow being managed. For example, if the flow to be managed is using a tag to aggregate traffic, the Session ID and other Protocol Data Unit (PDU) and Session Data Unit (SDU) information may be used to switch traffic to the proper Physical (Phy) Port, as shown in header portion 604 in FIG. 6. The remainder of the header portions (Source Address (SA), Destination Address (DA), and Physical or Logical (Phy/Logical) Port Address) are considered "don't care" (forced match) for the comparison. If, on the other hand, individual flows are being managed, header portion 606 would be compared where the Session ID is "don't care." Additionally, if a Virtual Private Network (VPN) tunnel is being managed, the relevant header portion 608 would be compared where the Session ID and Phy/Logical Port Address are "don't care." Further, if the managed flow comprised aggregated best effort (BE) traffic, header portion 610 would be compared where only some of the DA (a DA range) would participate, and the remainder of the relevant header portion would be "don't care."

If the session ID, source address, destination address or other SDU and PDU data are not located in the lookup table 602 (FIG. 6) (so-called "non-registered traffic"), then the packet header remains unchanged, and the packet is routed to any one of several possible processes, including but not limited to (FIG. 7D), forward packet process 815, analyze packet process 816, or discard packet process 814, in which case no operation occurs on the packet, as if the packet had not passed through the data controller 214 at all. Alternatively, the data controllers may block non-registered traffic, passing only managed session traffic specifically addressed to the data controller. Also, alternatively, the data controllers may divert traffic to special handling processes, such as where the traffic is malicious attack traffic, and the special handling processes might include attack mitigation or counter-measure processes. Because the data controllers do not process other signals or other bearer plane control signaling, the data controllers are less vulnerable to traditional Denial of Service (DoS) attacks.

If, however, the appropriate combination of session ID, source address, and destination address is located in the in-bound lookup table 602 (so-called "registered traffic"), then the in-bound CAM 504 sends a Match Address to out-bound CAM 518, which locates a header entry corresponding to the located header portion from in-bound CAM 504 in an out-bound CAM 518 lookup table 604. A selected header portion(s) 612, for example, located in the out-bound lookup table 604 is (are) then substituted for the corresponding portion(s) of the packet header located in the in-bound lookup table 602, and the packet is transmitted towards its new destination via one of the port interfaces 236. In this way, the packet is forced to travel to a controlled destination, i.e., toward the next data controller along the predetermined route generated and controlled by the cognitive controllers and the management controllers, respectively. This ability to switch registered traffic over characterized IP links in a deterministic way enables the cognitive network to assure QoS across the entire network, including over multiple carriers' networks.

Figure 7A:
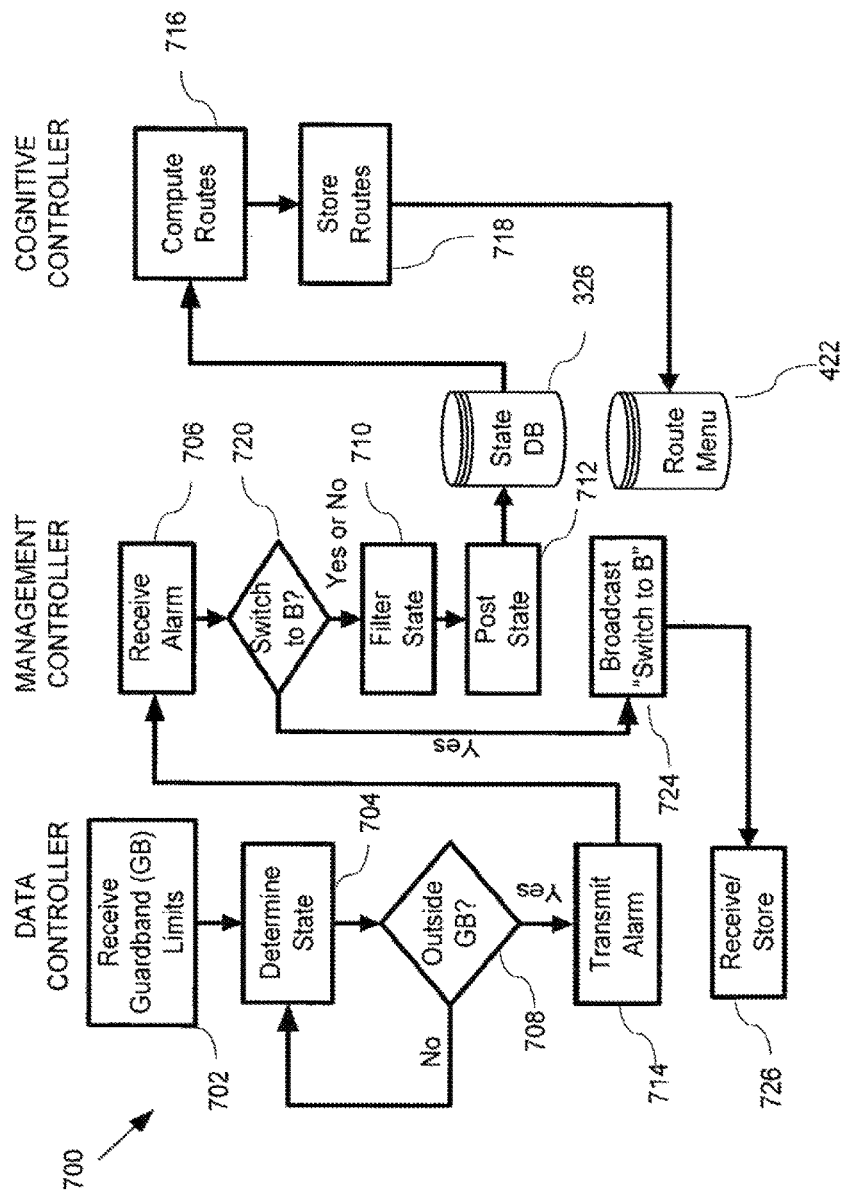
FIGS. 7A through 7D are flow charts for a method for routing data across a network, according to an embodiment of the invention.

FIG. 7A is a flow chart of a method 700 for cognitively determining the state of the network and for generating routes through the network. Each data controller 112 (FIG. 1) in the network periodically receives allowed states of the surrounding network at step 702 (guard band limits). In other words, the state determination procedures 224 (FIGS. 2A and 2B) in each data controller, either on their own or based on instructions received from the management controllers 116, periodically determine in step 704 the current or last-known status, or condition, of a process, transaction, or setting, such as transmittal and/or receipt of a heartbeat packet. The state determination interval varies as needed to reflect a sufficiently current condition to allow cognitive route planning with predictable, deterministic delays through the network. Said intervals can vary, but need to reflect the state of links with a resolution smaller than the error tolerance of the data transport being managed, for example, a millisecond might be preferred in order to control events on a scale of tens of milliseconds, depending on many factors, including, for example, link performance stability.

If this state information falls outside pre-determined and variable parametric guard band limits (determined in step 708), an alarm is then transmitted to a management plane controller 116 at step 714. The management plane controller 116 then receives the state information, including the alarm, at step 706, and the failure determination procedures 324 (FIG. 3) determine in step 720 whether the data controller or network has failed based on the received state information at step 706. If analysis of the alarm in step 720 indicates a failure has been reached when the received state information does not meet a predetermined minimum standard, a decision is made in step 720 as to what preferably pre-planned responsive action is required. One possible action would be to send to relevant data controller(s) upstream from the failing link or data controller a message to switch the routing of subsequent traffic to a back-up route (B in this example) at step 724. Other actions are possible, such as, for example, downgrading the sessions being transported over the subject link or data controller 112 such that the traffic passing over that link or through that data controller is provided with a lower quality or class of transport service. Using the out-of-band control and end-to-end knowledge of the state of the overall network afforded by management plane 104 working in concert with cognitive plane 102 and the measurements taken by data controllers 112 allows the optimization of network operation around any defined set of constraints (cost, performance, reliability, security, priority, etc.).

This instruction to switch from the primary route to the appropriate relevant backup route is received and stored by the data controllers in the CAM arrays at step 726. In a preferred embodiment, the system can switch a flow to the back-up routes within a short enough interval, say 50 msec, of the onset of a problem, to avoid material interruption of the flow, preserving QoS to a required level.

Whether or not the received state information indicates responsive action, the state information is then evaluated for relevancy by the filter procedures 322 (FIG. 3) at step 710. For example, information about unreasonable or anomalous state changes is filtered from the remainder of the state information, thereby reducing the size of and load on the state database that needs to be managed and the volume of traffic that needs to be transported between management plane 104 and bearer plane 106. The relevant or filtered state information is then posted to, or stored in, the state database 326 (FIG. 3) at step 712.

As the data controllers periodically report their state and the state of the network data transport links, the state or volume of the observed unmanaged data sessions, and the state or volume of the managed data sessions, the state database 326 (FIG. 3) is continually updated with the latest network state information. As new data controllers are placed into service, they will automatically begin reporting their state and updating the state database with new state information for new parts of the network. Similarly, if data controllers are taken out of service or fail, the management controllers will stop receiving state information from those data controllers and will update the state database accordingly.

At any time, the cognitive controllers 118 access the state database 326 (FIG. 3) to compute primary and backup routes for different types of service, at step 716. For example, the most reliable, highest performing links will be used as components to construct service routes with a high QoS, while the less reliable links will be used as components to construct service routes that have a lower QoS. The routes are then stored for later use in the route menu 422 (FIG. 4) at step 718. It is not necessary that the route computations occur in real time, as the routes are computed ahead of time and in the background and stored for later use. Routes are calculated in such a way as to optimize the network through the use of a series of related formulae generally referred to as linear programming. In this way, use of network resources can be managed to optimize services, reducing undesirable effects such as cost or overloading the best-performing data transport links and maximizing desirable effects such as revenues or use of minimally performing data transport links. Failure responses are calculated in advance in much the same manner by first altering the matrix of link state parameters and then optimally solving the network loading problem. In this way optimal responses to foreseeable changes in the state of the network are pre-calculated and stored as part of the route menu for use as and when necessary.

Figure 7B:
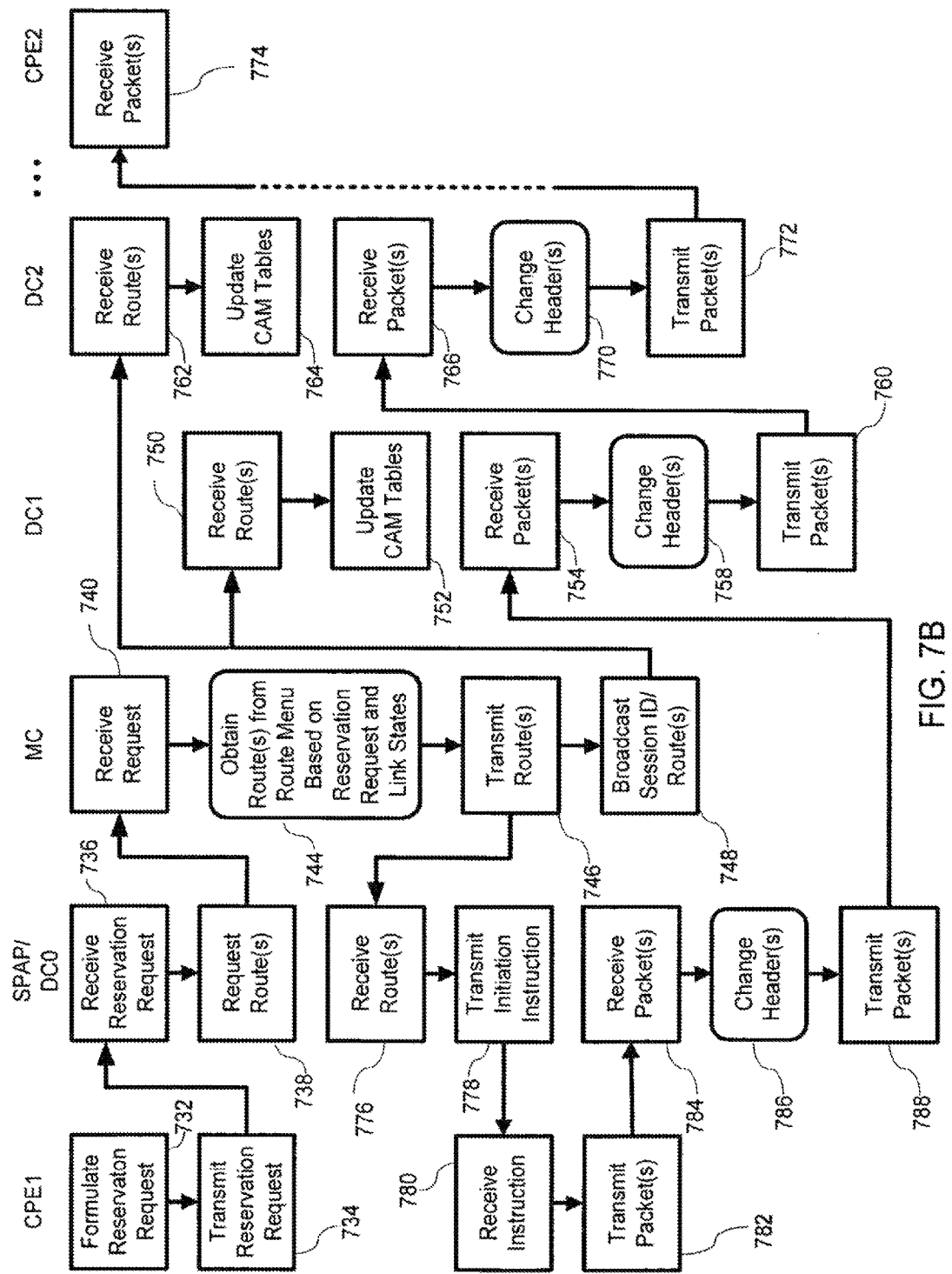
Figure 7C:
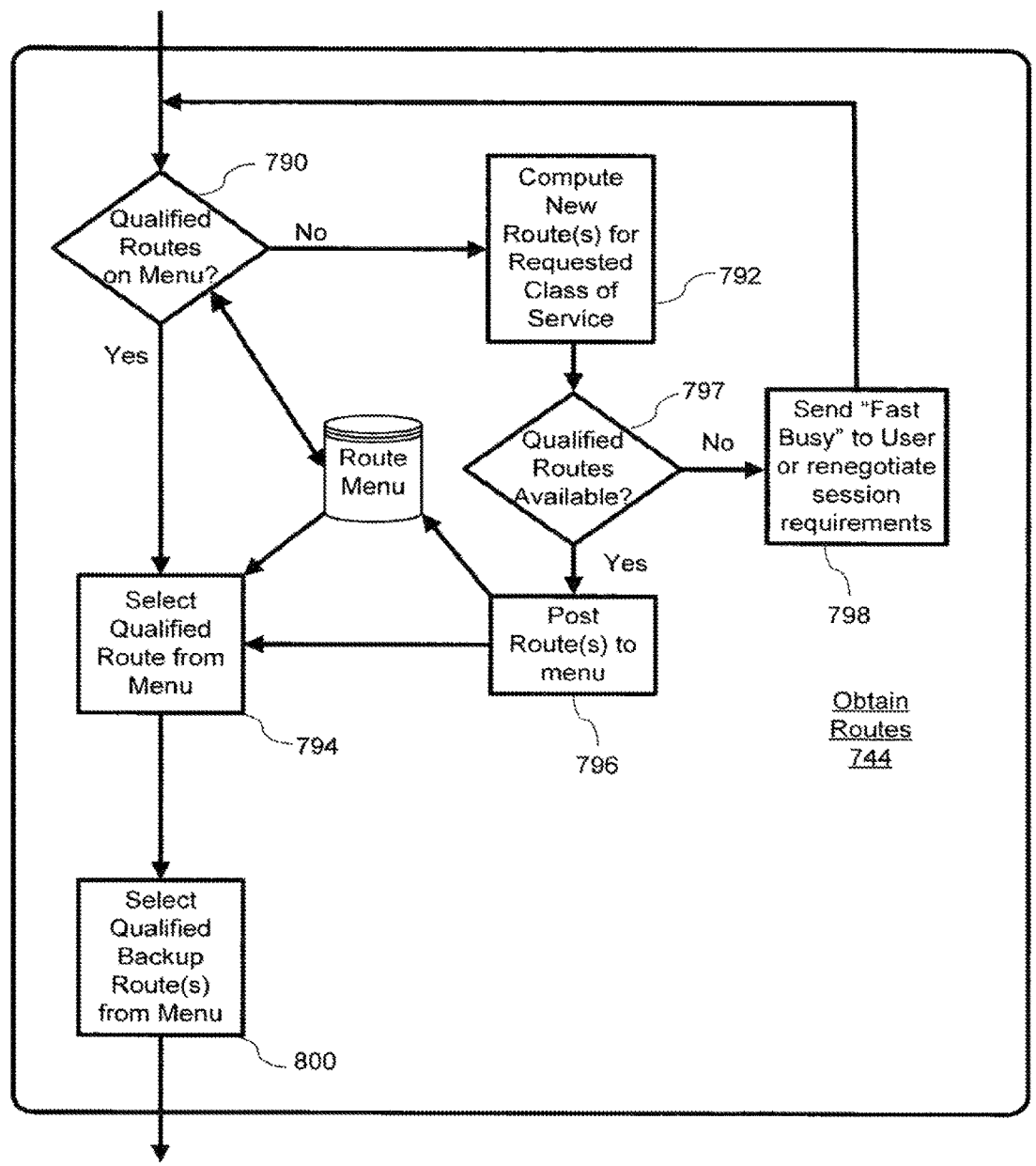
Figure 7D:
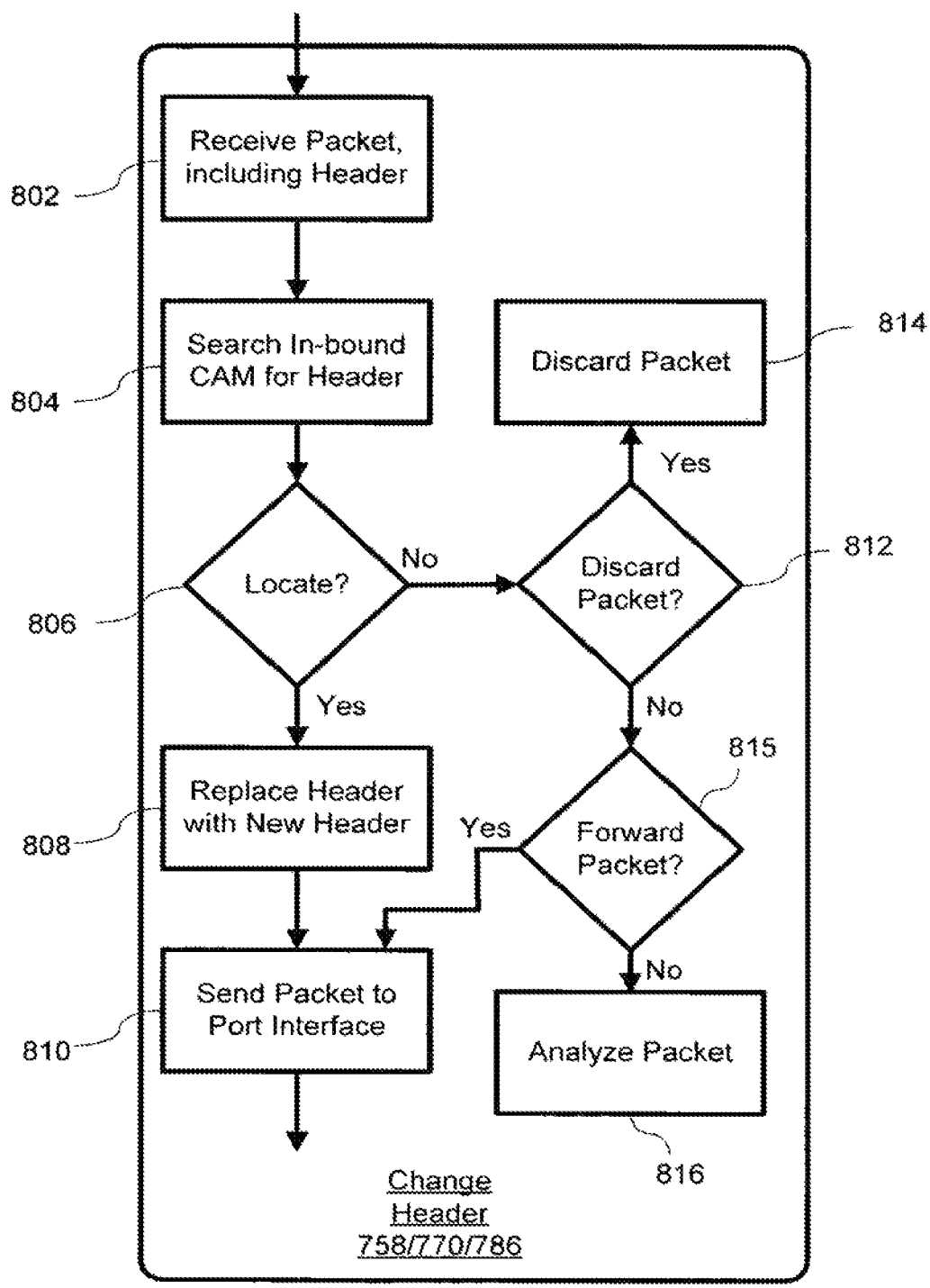

FIGS. 7B-D are flow charts showing a method for routing data across a network, according to an embodiment of the invention. Initially, when a user of the service desires to send data across the network, the user completes a reservation request for a particular class of service at step 732. The reservation request may be completed manually or automatically, for example as when a user lifts the receiver of telephone that uses a voice-over-IP (VoIP) service, a reservation request is formulated requiring a bi-directional, full duplex, voice quality, data transfer. In a preferred embodiment, standard reservation protocols, such as SIP or H.323, are used to reserve the desired service.

The reservation request is transmitted by the user's Customer Premise Equipment (CPE) toward a DC in the user's SPAP at step 734. The reservation request is received by the SPAP at step 736, which then requests one or more routes for the particular reservation request from the management controller, at step 738. The reservation request can be received either explicitly, such as by a user requesting a particular class of service, or implicitly, such as by the type of data transport being made, like a VoIP call being made. Alternatively, the reservation request may be generated internally by the data controller 110 (FIG. 1). The request for routes includes the class of service required, for example, a voice-quality session at the requisite cost, reliability, security, priority, etc. The management controller receives the request for routes, at step 740, and obtains such routes at step 744.

As shown in FIG. 7C, to obtain routes, the route select procedures 327 (FIG. 3) determine, at step 790, whether there are any routes in the route menu 422 (FIG. 4) that qualify for the class of service requested. If there are no routes in the route menu that qualify for the class of service requested (790—No), then the management controller requests the cognitive controller to calculate the new routes, using the route generation procedures 424 (FIG. 4) at step 792. The new route(s) are then posted to or stored in the route menu 422 (FIG. 4) at step 796.

If there are no qualified routes available (step 797), the management controller signals the requesting user at step 798 indicating that the user should try again later. Alternatively, at step 798, the management controller could suggest alternatives or renegotiate the requirements for the session such that available routes are deemed qualified.

If there are routes in the route menu that qualify for the class of service requested (790—Yes), or once the new route(s) have been posted at step 796, a qualified primary route is selected from the route menu at step 794. One or more backup routes may also be selected at step 800, depending on the requested class of service.

Returning to FIG. 7B, once qualified route(s) are obtained at step 744, the required DC update information (CAM array updates) is transmitted to the Data Controllers (DCs) that require the information. The DC update information is received by the DC at step 776, which then transmits an instruction to the CPE to initiate the data transmission session at step 778, directing its registered traffic to DC0 in SPAP1.

At the same time as the management controller transmits the required DC update information to DC0 at SPAP1, at step 746, the management controller preferably transmits the required DC update information (CAM array updates) needed to process the data session packets along the selected route(s) to all data controllers 112 that require such information along both the primary and backup route(s), if any. Such specific information, and any other control traffic between the management plane 104 and the bearer plane 106, is preferably encrypted. Each data controller along the route(s) then receives the required DC update information (look-up tables 602 and 604 stored in CAMs 504 and 518), which may include, but is not limited to, session ID and/or source and destination packet addresses, and/or tag information, at steps 750 and 762, and updates their CAM tables 602 and 604 (FIG. 6) at steps 752 and 764 respectively such that the packets can be directed along the designated route(s) between DCs.

After the instruction is transmitted to the CPE to initiate the data transmission session at step 778, the instruction is received by the CPE at step 780, which then transmits the packet(s) toward SPAP1 and DC0 at step 782. The packet(s) are received by the DC at step 784, and, if necessary, the header of the packet(s) is changed by the HAC™ card 214 in DC0, at step 786, to force the packet to be routed along the primary route determined by the system.

Further details of how the header is changed will be explained with reference to FIG. 7D. The packet is received by the data controller's HAC™ card 214 (FIG. 2) at step 802. The packet is passed into the packet buffer 520 (FIGS. 5A and 5B), while the header is examined. The in-bound CAM Array 504 (FIGS. 5A and 5B) is searched to identify the packet by matching some combination of attributes, which might include the session ID, source address, and/or destination address, and a tag, from the received packet's header at step 804. If a match is not located (806—No), then the control logic determines whether the packet should be discarded, forwarded, or subject to alternative handling at step 812. Alternative handling may include any number of procedures including, but not limited to, passing the packet along intact or analysis at step 816. Analysis might include, for example, determining if this packet is malicious traffic and launching counter measures against the associated attack. If the packet is to be discarded (812—Yes), then the packet is discarded at step 814.

If a match is located (806—yes), then the control logic modifies relevant portions of the header with required new header data from the out-bound CAM array 518 (FIG. 5), at step 808, and sends the revised packet to the destination port interface 236 (FIG. 5) at step 810. For example, the header is changed in DC0's HAC™ card to add a session ID, and to change the source IP address to DC0's source address, and the destination address to that of the next data controller along the route (DC1 in this example). The revised packet is then transmitted to the destination address contained in its revised header at step 788. In general, the destination address will be the next data controller along the predetermined route. Between data controllers, the packet will be routed via IP routers, direct connection, switches, or the like, as is well understood in the art. Accordingly, the more data controllers provided throughout the network, the more control the system has over the routing and the better able the system is to deliver service with a defined QoS.

The packet is subsequently received by the second data controller (DC1) at step 754. The header is changed, if necessary, at step 758, and the packet transmitted to the next data controller at step 760. Changing the header at step 758 is identical to step 786 described above. The packet is then received by the third data controller (DC2) at step 766, the header changed, if necessary, at step 770, and the packet transmitted to the next data controller at step 772. Changing the header at step 770 is identical to step 786 described above. At the final DC, near the original destination address, the final DC destination address in the header is changed to the original destination address, e.g., CPE2. The packet(s) are then received by the original destination (CPE2) at step 774. Sessions can be unidirectional or bi-directional as required by the users' applications.

Accordingly, the invention realizes several benefits, including:

1) Management that resides outside the IP bearer plane can orchestrate the routing of traffic in a highly efficient manner, because routing computations are performed with the benefit of more complete and stateful information about the network and the demands being placed on it in one logically cohesive fault-tolerant plane rather than similar calculations being replicated at each router with incomplete and out of date information about the network and the demands being placed on it.

2) Pro-actively directed data traffic, using data transport links qualified by the management plane based on state information collected in the bearer plane, such that the traffic can traverse the IP bearer plane with deterministic and predictable performance. Unlike in currently deployed connectionless data networks, said performance can be guaranteed by the data carrier, raising the value of data transport services while lowering transport cost through increased efficiency and loading optimization.

3) Removing control information from the data transport bearer plane and placing it on separate connections for use by the management plane reduces the vulnerability of the data transport bearer plane to Denial of Service (DoS) attacks and other security breaches in a manner similar to security enhancements made in telephony networks of the past.

4) As packets for sessions under the control of the system are aggregated into larger flows because they are all assigned the same source and destination addresses in the core, the aggregated flows are very difficult to scan or "sniff" for private information.

5) The system preferably collects and retains session records in a database similar to the Call Detail Records (CDRs) that telephone companies are accustomed to recording and using. Such records are preferably backward-compatible with the standard billing software already used by carriers. This facet allows carriers to monetize the IP traffic they carry based on the type of traffic, its duration, its distance, and its quality (value) for the first time, enabling new and profitable billing models for IP transport.

6) This network architecture uses well known principles of balancing inventories of resources (routes or links through the network with requisite characteristics) against users' demands in order to significantly raise network efficiency, lowering operating and capital costs.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. For example, signaling of control information could be accomplished in the bearer plane over separate links to accomplish a virtual out-of-band signaling means with concomitant reduction in network security. Furthermore, specific data protocols, such as TCP, can be mapped to specific routes, or mapped to specific ports on the data controllers. This capability allows the data controllers to be backward compatible and/or to act as routers. In other words, the protocol-to-port mapping extends to data controllers without the need for the data controllers to natively support the protocol.

In general, alternative methods preferably meet all of the following four criteria:
1. The network preferably behaves in a connection-oriented manner for time-sensitive (or other parameter-sensitive) traffic while retaining connectionless behavior for best-effort traffic.
2. The network is preferably controlled with an out-of-band means to enhance security and provide an end-to-end view.
3. The network preferably determines and retains current state information with periodic measurements to enable pro-active near-real-time control.
4. The network control logic, although physically distributed, is preferably logically coherent to enable end-to-end control over one or multiple networks and to effect significant increases in network efficiency through better utilization and lower operating costs.

Also, any graphs described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What is claimed is:

1. A computer-implemented method for end-to-end control of data transport through a software-programmable packet-, frame-, or cell-based network, comprising: controlling data transport through the network with one or more switching or forwarding devices distributed throughout the network in a first logical plane, wherein said switching or forwarding devices receive instructions from one or more management controllers situated in a second, logically separate plane for directing data transport through the network wherein said one or more management controllers further communicate with, to at least receive instructions from, at least one cognitive controller situated in a third, logically distinct control plane, said at least one cognitive controller containing instructions for computing routes through said network.

2. The method of claim 1, wherein said one or more switching or forwarding devices comprise a plurality of at least one of routers, data controllers, and switches communicating through data links for transporting data packets between a source and a destination.

3. The method of claim 1, wherein said instructions received by said switching or forwarding devices comprise instructions corresponding to at least one determined route through said network, said route determined by at least one said management controller in said second, logically separate plane.

4. The method of claim 3, wherein said at least one determined route comprises a currently compliant route through said network.

5. The method of claim 4, wherein said switching or forwarding devices periodically receive current state information for said network.

6. The method of claim 5, further comprising transmitting an alarm to a management controller in the second, logically separate plane in the event of received current state information falling outside predetermined limits.

7. The method of claim 3, wherein said instructions received by said switching or forwarding devices further comprise instructions for changing an address or other header information of data packets, frames or cells in a data transfer session to effect network function.

8. The method of claim 7, wherein said network function comprises directing said packet, frame or cell along said determined route.

9. The method of claim 7, wherein said network function comprises enhancing network security.

10. A system for end-to-end control of data transport through a software-programmable packet-, frame-, or cell-based network comprising plural switching or forwarding devices dispersed throughout and communicating through data links in a first logical control plane, the system comprising:
one or more management controllers dispersed throughout a second, logically distinct control plane, each said management controller configured for control of plural said switching or forwarding devices, wherein said switching or forwarding devices receive instructions from one or more management controllers;

one or more distinct communications circuits providing communication between said management controllers and said switching or forwarding devices; and at least one cognitive controller disposed in a third, logically distinct control plane, said at least one cognitive controller communicating with said at least one management controller, wherein said at least one cognitive controller contains instructions for computing routes through the network.

11. The system of claim 10, wherein said at least one management controller includes instructions for transmitting packet-, frame-, or cell handling instructions to plural said switching or forwarding devices in response to receiving a reservation request for a data transport session.

12. The system of claim 11, wherein said reservation request contains a requested class of service through said network.

13. The system of claim 11, wherein said management controller includes instructions for monitoring and accounting for actual usage of currently compliant routes through said network sufficient to enable usage related analysis.

14. The system of claim 10, wherein said one or more distinct communications circuits comprise one or more circuits disposed logically outside the first logical control plane.

15. The system of claim 10, wherein said one or more distinct communications circuits comprise one or more dedicated physical circuits outside the first logical plane or one or more dedicated virtual circuits within said first logical plane.

16. The system of claim 10, wherein said switching and forwarding devices comprise a plurality of at least one of data controllers, switches, routers, firewalls, or other packet frame or cell transport or processing devices including a mechanism configured to deterministically and explicitly direct each data packet, cell, or frame in said data transfer session to a next data controller along a currently compliant route in response to instructions from said at least one management controller utilizing packet-, frame-, or cell-based information.

17. The system of claim 10, wherein said at least one cognitive controller contains instructions for computing routes compliant with offered classes of communication service.

18. The system of claim 17, wherein said at least one cognitive controller further contains instructions for analyzing network usage.

19. The system of claim 18, wherein said instructions cause said at least one cognitive controller to provide at least one of enhanced overall network security or optimized economic performance of said network.

20. A system for end-to-end control of data transport through a software-programmable packet-, frame-, or cell-based network comprising plural switching or forwarding devices dispersed throughout and communicating through data links in a first logical control plane, the system comprising:

one or more management controllers dispersed throughout a second, logically distinct control plane, said management controllers configured for control of said switching or forwarding devices; and one or more distinct communications circuits providing communication between said management controllers and said switching or forwarding devices, wherein said management controller includes instructions for monitoring and accounting for actual usage of currently compliant routes through said network sufficient to enable usage related analysis;

wherein said at least one management controller includes instructions for transmitting packet-, frame-, or cell handling instructions to at least one said switching or forwarding devices in response to receiving a reservation request for a data transport session; and wherein the usage related analysis comprises differentiated usage-based billing analysis.

21. A computer-implemented method for end-to-end control of data transport through a software-programmable packet-, frame-, or cell-based network comprising a plurality of switching or forwarding devices communicating through data links distributed throughout the network in a first logical plane to transport data between a source and a destination based on address information included with said data, the method comprising:

receiving, at one or more management controllers situated in a second, logically separate plane, transport-related information associated with said data;

determining at least one route for said data through said network based at least in part on said transport-related information; and directing, with said one or more management controllers, plural switching or forwarding devices in the first logical plane to transport said data along said determined route;

wherein said one or more management controllers further communicate with at least one cognitive controller situated in a third, logically distinct control plane, said at least one cognitive controller containing instructions for computing routes compliant with offered classes of communication service.

22. The method of claim 21, wherein said transport related information comprises at least one of switching or forwarding device and communication link state information.

23. The method of claim 21, wherein said switching or forwarding device or communication link state information comprises an alarm indicating a non-compliant state at a switching or forwarding device in the first logical plane.

24. The method of claim 23, wherein alarm response alternate packet, cell, or frame handling instructions are preloaded into the switching or forwarding devices.

25. The method of claim 23, wherein said alarm is communicated using a communications link either logically or physically distinct from the data transport link being controlled.

26. The method of claim 21, wherein said transport related information comprises reservation request-based route information.

27. The method of claim 26, wherein said reservation request-based route information comprises one of an explicit session based or implicit policy based reservation request.

28. The method of claim 21, wherein said transport related information comprises packet, cell or frame header information.

29. A system for control of data transport through a connectionless network including multiple data controllers dispersed throughout a network, said system comprising:

multiple data controllers a circuit; and at least one management controller coupled to said multiple data controllers via said circuit, wherein said at least one management controller provides instructions for:

receiving a reservation request for a data transport session, where said reservation request contains a requested class of communication service through the network;

obtaining at least one route through said network, where said route is based on said requested class of service and a state of said network; and controlling said multiple data controllers, such that data is forced to travel along said at least one route; and wherein said one or more management controllers are further configured to communicate with at least one cognitive controller situated in a third, logically distinct control plane, and receive instructions from said at least one cognitive controller for computing routes compliant with offered classes of communication service.

* * * * *